(12) United States Patent
Hanson et al.

(10) Patent No.: US 6,241,897 B1
(45) Date of Patent: Jun. 5, 2001

(54) DISSOLUTION OF GAS

(75) Inventors: Cedric Hanson, Nettleham; Michael Jack Race, Greasbrough, Rotherham, both of (GB)

(73) Assignee: The BOC Group plc, Windlesham (GB)

( * ) Notice: Subject to any disclaimer, the term of this patent is extended or adjusted under 35 U.S.C. 154(b) by 0 days.

(21) Appl. No.: 09/416,467

(22) Filed: Oct. 12, 1999

(30) Foreign Application Priority Data

Nov. 19, 1998 (GB) .................................................. 9825380

(51) Int. Cl.$^7$ ........................................................ C02F 1/74
(52) U.S. Cl. .......................... 210/739; 210/614; 210/627; 210/628; 210/758; 261/26; 261/63.1; 261/DIG. 75
(58) Field of Search .................................. 210/614, 627, 210/628, 629, 739, 758, 221.2; 261/26, 36.1, DIG. 75

(56) References Cited

U.S. PATENT DOCUMENTS

| | | | |
|---|---|---|---|
| 4,285,818 | * 8/1981 | Muskat | 210/614 |
| 4,818,408 | * 4/1989 | Hamamoto | 210/614 |
| 5,057,230 | * 10/1991 | Race | 210/758 |
| 5,332,502 | * 7/1994 | Wickens et al. | 210/605 |

FOREIGN PATENT DOCUMENTS

| | | |
|---|---|---|
| 0 389 230 B1 | 9/1990 | (EP) . |
| 0 673 885 B1 | 9/1995 | (EP) . |
| 1 455 567 | 11/1976 | (GB) . |

\* cited by examiner

Primary Examiner—Peter A. Hruskoci
(74) Attorney, Agent, or Firm—Philip H. Von Neida; Salvatore P. Pace

(57) ABSTRACT

Liquid in which oxygen-containing gas is to be dissolved is pumped through a main and distributed into faster-moving subsidiary streams. Each subsidiary stream passes through a turbulence-inducing means and air or oxygen is introduced into the turbulent region of alternate streams. The relative proportions of air to oxygen introduction are varied so as economically and efficiently to oxygenate the liquid. The gas-containing liquid passes through nozzles back into the volume of the liquid at sufficient velocity to cause further turbulence, making gas bubbles shear into smaller bubbles and also agitating the body of liquid.

3 Claims, 4 Drawing Sheets

DISSOLUTION OF GAS

This invention relates to a method and apparatus for dissolving a gas, in particular oxygen-containing gas, in a liquid, such as water or an aqueous medium such as waste water. The invention is limited neither to the example of oxygen as the gas nor to the example of an aqueous medium but may be used to dissolve other gases having a greater or lesser solubility than oxygen in aqueous or non-aqueous media.

Our UK patent specification No 1 455 567 discloses a process for treating liquid including the steps of taking a stream of the liquid, pressurising the stream, introducing a treatment gas into the pressurised stream so as to dissolve therein some of the gas, and introducing the stream containing dissolved and undissolved gas into a volume of the liquid under turbulent conditions such that the undissolved gas enters the volume of liquid in the form of fine bubbles that either dissolve or are consumed within the volume of liquid. The method is typically used to dissolve oxygen in an aqueous medium. The oxygenated stream is typically introduced back into the main volume of liquid through one or more orifices or jets. Undissolved oxygen bubbles are transported in the stream to the orifices or jets. The length of the conduit through which the stream flows from the point of oxygenation to the jet or jets is chosen so as to facilitate dissolution of some of the gas in the liquid without being so long that the gas bubbles tend to coalesce into separate pockets or slugs of gas or that the pressure drop is disproportionate to the amount of gas that dissolves in the conduit.

The process described in UK patent specification 1 455 567 has been commercially successful particularly in the oxygenation of water to improve the treatment of sewage. We attribute this success at least in part to the fact that the process admits much more gas to be retained in the body of the liquid than prior process operating with same power consumption. By using the stream as a carrier of gas bubbles a much higher quantity of gas can be successfully dissolved than if the amount of gas carried in the stream is merely limited to that which can be dissolved therein.

Another advantage afforded by the process according to UK patent specification 1 455 567 is that the stream returning to the main volume of liquid agitates the liquid thereby helping to keep solids in suspension and assisting in the distribution of oxygen throughout the volume. However, a difficulty arises when a large volume of liquid, for example an activated sludge tank used in the treatment of sewage having a volume of more than 1000 $m^3$ cubic meters, a sewage lagoon, or a long stretch of river requires oxygenation. The difficulty is that more than one oxygenation apparatus with its own separate pump is required. The requirement arises out of the fact that if several subsidiary oxygenated streams are returned to the main volume of liquid at widely spaced locations, there is a high frictional loss in the associated pipework with a result that the subsidiary streams do not impart sufficient energy to the main volume of the liquid to cause the desired degree of agitation.

A solution to these problems is set out in our European Patent No. 389230 B1, which discloses a method and apparatus for dissolving gas in a volume of liquid in which liquid is pressurised and formed into a main stream which is distributed into a plurality of subsidiary streams each having a velocity greater than that of the main stream. Each subsidiary is passed through a venturi such that turbulence is created therein, and gas is introduced into the turbulence. The gas-containing subsidiary streams are introduced into the volume of the liquid at a velocity sufficient to create further turbulence causing bubbles of gas to shear into smaller bubbles.

Such an arrangement is particularly suited for oxygenating waste water, and is capable of dealing with the frequently highly fluctuating oxygen demands often found in industrial waste processing plants, but only at unnecessary expense. Where the oxygenating gas is oxygen, then the oxygen supply system must be capable of satisfying peak oxygen demand; this results in over-capacity of oxygen supply capability, since the oxygen demand peaks are intrinsically transient, and the oxygen source is under utilised. Moreover, the use of oxygen to meet the oxygen demand is inherently more expensive than is the use of air. However, the use of air is also economically disadvantageous, because more air is required for a given oxygenation level compared to oxygen. And again, because of the erratic levels of oxygen demand, the air supply system must be capable of meeting peak demand levels which occur infrequently, which means that for much of the time the air supply system is not used to its full capacity. In treating wastes with a high oxygen demand or with a fluctuating demand it may not be practicable or cost effective to utilise air alone for oxygenation, as the cost of providing sufficient air to achieve the necessary oxygenation level may be prohibitive.

Accordingly, the present invention provides a method of dissolving oxygen-containing gas in a volume of liquid having a variable oxygen demand comprising pressurising the liquid, forming a main stream of the liquid, distributing the main stream into a plurality of subsidiary streams each having a velocity greater than that of the main stream, passing each of the subsidiary streams through means configured to create turbulence therein, introducing gas into the turbulence and introducing the gas-containing subsidiary streams into the volume of the liquid at a velocity sufficient to create further turbulence causing bubbles of said gas to shear into smaller bubbles, characterised by introducing oxygen into a first set of the subsidiary streams and air into a second set of the subsidiary streams, by sensing the instantaneous oxygen demand in the volume of liquid, and by controlling the relative proportion of oxygen and air introduced so as to meet the sensed instantaneous oxygen demand.

The invention also provides an apparatus for dissolving oxygen-containing gas in a volume of liquid having an oxygen demand, the apparatus comprising a pump, a main conduit, a plurality of first and second subsidiary conduits in communication with the main conduit each of which includes means configured to create turbulence in the flowing liquid, means for introducing gas into the turbulence and a nozzle terminating in the volume of the liquid and having an outlet configured such that the liquid is introduced into the volume of liquid at a velocity sufficient to create further turbulence, and means for sensing the oxygen demand in the volume of liquid, characterised in that the gas introducing means in the first and second subsidiary conduits are adapted for introducing oxygen and air, respectively, and in that control means responsive to the sensed oxygen demand are provided to vary the relative proportions of oxygen and air introduced.

The methods and apparatus according to the invention are particularly suited for use in oxygenating waste water at significantly greater efficiency and less cost than in the prior art. Satisfying a proportion of the oxygen demand by the use of air as an oxygenating gas reduces the capacity of oxygen supply required, whilst the oxygenation of the remaining proportion utilising oxygen is highly efficient for tracking accurately variations in oxygen demand. Moreover, the replacement of at least some of the oxygen formerly used for oxygenation with air leads to significant reductions in cost, because the provision of a supply of air is generally less expensive than the provision of an equivalent supply of oxygen. This apparatus is also particularly suited to injecting air to enable stripping of carbon dioxide, which is known to cause problems through pH depression and/or toxicity in pure oxygen based systems. A further use of the apparatus is to inject other liquids or gases e.g. sodium hypochlorite, magnesium hydroxide, chlorine, carbon dioxide and ozone (for example, to suppress filamentous bacteria). Also, practical embodiments of the invention have the elegant advantage of being able to use a single air pump, or compressor, for the supply of the air both for oxygenation and also to the oxygen supply means (in large oxygenation applications, an oxygen supply means is often provided adjacent the tank of liquid to be oxygenated, this oxygen supply means normally requiring a supply of compressed air from which the oxygen for oxygenation is separated); this is particularly advantageous since both the capital and the running costs of providing a single air compressor of large enough capacity to meet peak oxygen demand levels in the liquid to be treated are significantly less than those of providing, separately, either oxygen or air supplies of excess capacity. A further advantage of the invention is that a single water pump can be used to supply liquid to all of the subsidiary conduits.

Preferably the rate of introduction of air is maintained at a constant level and the oxygen introduction rate varied in response to changes in the oxygen demand, as the higher solubility of oxygen compared to that of air enables rapid changes in oxygen demand to be followed more closely. Alternatively however, the oxygen introduction rate may be maintained constant and the air introduction rate varied as appropriate.

The velocity of flow in the mainstream is preferably in the range of 2 to 4 feet per second (0.65 to 1.3 ms$^{-1}$), which is just above the velocity needed to scour the main of any deposited solids and so minimise the frictional losses of the liquid pumping energy. This allows the maximum proportion of the pumping energy to be used for the oxygen-containing subsidiary streams to penetrate and agitate the main volume of liquid, the velocity at which each subsidiary stream is introduced, in the form of one or more jets, into the volume of liquid advantageously being in the range 30 to 65 feet per second (10 to 20 ms$^{-1}$).

Preferably, means are provided for independently controlling the subsidiary streams and/or the means for introducing gas thereinto. Such an arrangement optimises the dissolution of gas throughout that volume of liquid. Moreover, independent control of the subsidiary streams allows the mechanical agitation of the volume of liquid to be controlled, so as to optimise circulation of the gas-containing liquid, and/or to prevent consolidation of matter entrained in the liquid.

Conveniently, the subsidiary conduits are dimensioned such that the liquid accelerates in flowing from the main conduit to each of the subsidiary conduits. Each conduit preferably has a section of gradual restriction of cross-sectional area in the direction of liquid flow, and there is provided a chamber surrounding the conduit immediately downstream of said section, into which chamber the gas is introduced and a plurality of apertures thereat for passage of gas from the chamber into the fluid in the conduit.

Where the conduit is adapted for introducing oxygen into the liquid, the turbulence-creating configuration suitably comprises a venturi having a throat configuration which the chamber surrounds, the nozzle outlet also being configured to accelerate the flow of oxygen-containing liquid and to create further turbulence.

Where the conduit is adapted for introducing air into the liquid, the turbulence-creating configuration may comprise the portion of the nozzle upstream of the nozzle outlet. There is no venturi in such an arrangement because this would require an increase in the pressure necessary to apply to the air in order for it to pass into the conduit; to overcome such "back pressure" would require increasing the power of the air pump or compressor, which would clearly be disadvantageous.

The position of each nozzle is ideally adjustable independently of the other nozzles, both up and down and from side to side, so that the jets from each subsidiary conduit can be accurately and independently directed (and this movement may be automated, so as to effect a rolling cycle of agitation in the volume of liquid). Each venturi may be integral with an associated nozzle, and the upstream end of each venturi (or of the nozzle, in the case of a subsidiary conduit for introducing air) may be contiguous with the main.

The invention will now be described by way of example and with reference to the accompanying drawings in which.

Figure 1:
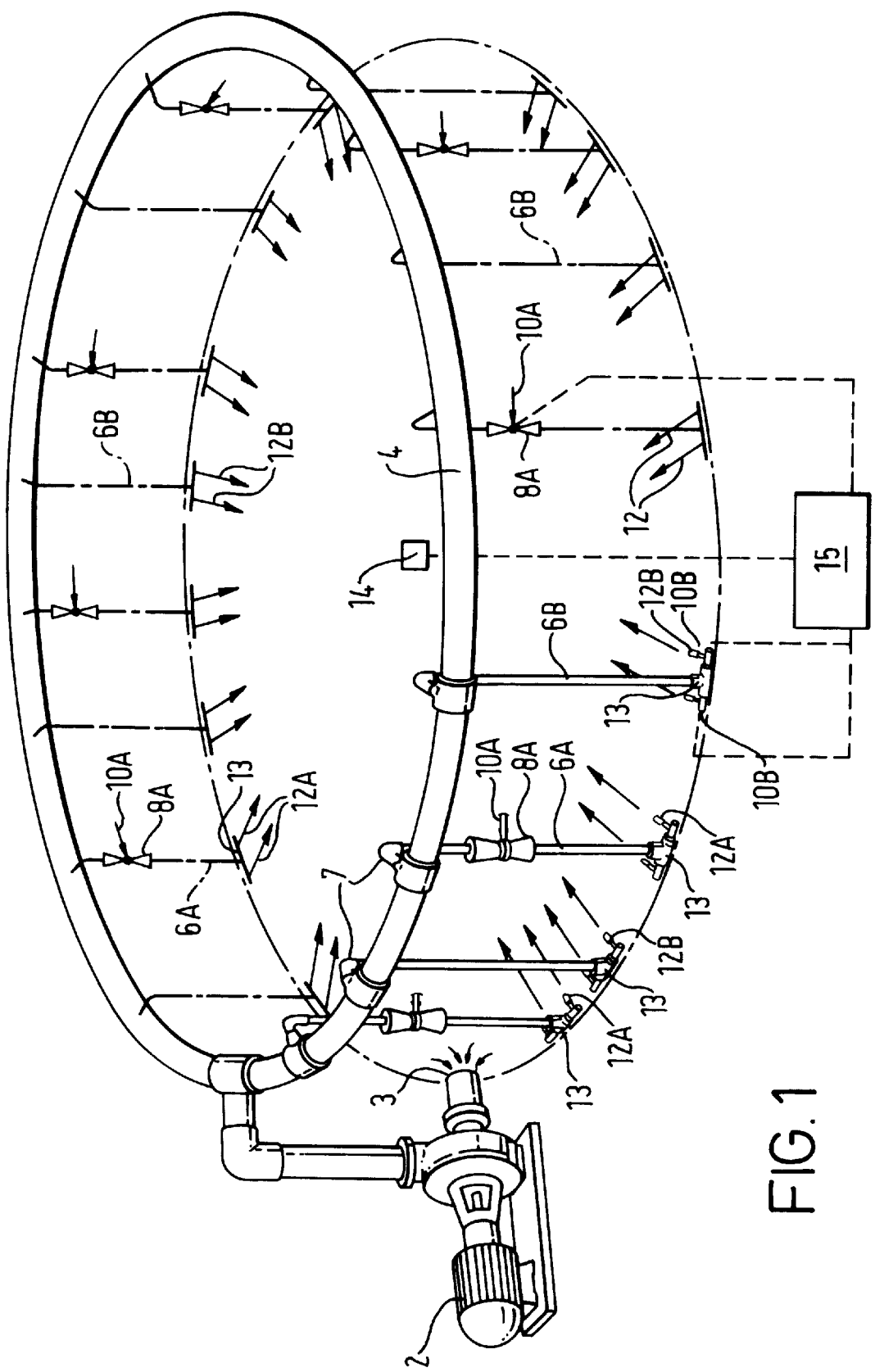
FIG. 1 is a schematic drawing, partly in perspective, of a first oxygenation apparatus according to the invention.

The drawings are not to scale.

For the avoidance of doubt, like parts in different drawings are referred to below by the same reference numeral. The use of the Suffix A denotes an element particularly adapted for the introduction of oxygen and the Suffix B denotes an element particularly adapted for the introduction of air.

Referring to FIG. 1 of the drawings, the illustrated apparatus may be located wholly within a large volume of liquid for example that contained in a sewage treatment tank for use in the activated sludge process. A sewage pump 2 having a suction inlet 3 forms a stream of waste water at a pressure of typically 2 to 4 atmospheres absolute. The stream enters a ring main 4. The velocity of flow of liquid in the ring main 4 is sufficient to prevent the build-up of solids in the ring main 4. The ring main 4 is adapted to feed the liquid to a plurality or multiplicity of spaced subsidiary conduits 6A, 6B which depend generally vertically therefrom, each such conduit being formed with an upstream elbow 7 contiguous with the main 4. Each conduit 6A, 6B is typically less than five meters in length (but can be more or less, depending on the depth of the sewage treatment tank) and each oxygen-introducing subsidiary conduit 6A has a venturi 8A disposed therein at an upper region thereof. Each venturi 8A has an inlet 10A for gaseous oxygen. The oxygen inlets 10A are connected to a common oxygen main (not shown) which is typically supplied from a plant for separating air by pressure swing adsorption (or by using membranes) or is a storage vessel containing liquid oxygen and fitted with an evaporator whereby the oxygen may be supplied to the conduit 6A in the gaseous state. Each venturi 8A creates a restriction in its associated conduit 6A whereby turbulence is imparted to the liquid flowing therethrough. It is also to be appreciated that each conduit 6A is preferably formed of a diameter substantially less than that of the ring main 4 whereby the liquid is accelerated as it flows from the ring main 4 into the conduit 6A. The flow of oxygen to the turbulent region from the inlet 10A breaks the oxygen into small bubbles, and similarly with the flow of air to the turbulent region from the inlet 10B. The suction created by the flow of liquid through the venturi may be used to create or assist the flows of oxygen.

Each air-introducing subsidiary conduit 6B has an inlet 10B for introducing air into the liquid immediately adjacent the outlet of the nozzle 12B from which the turbulent liquid stream passes into the surrounding liquid. There is otherwise no venturi in subsidiary air conduits 6B, in order to avoid the problems of overcoming high back pressure in the air supply system. The air inlets 10B are connected to a common air main (not shown) which is typically supplied from an air pump, or compressor (not shown). Advantageously this air compressor also provides the high pressure air supply to the air separation plant.

Each conduit 6A, 6B has a downstream T-piece pipe 13 at its bottom end in which is received one or more outlet nozzles for passing liquid-gas mixture into the main volume of liquid in which the ring main is immersed. Each nozzle 12A, 12B has an outlet diameter much smaller than that of the diameter of the associated conduit 6A, 6B whereby the liquid-gas mixture leaves the nozzle 12 at a relatively high velocity thereby creating turbulence, helping further to break up or shear bubbles in the mixture into even smaller bubbles that are readily consumed by or dissolve in the main body of liquid, providing intimate mixing thereof, and providing agitation for the main body of liquid. Typically, the nozzles 12 are disposed in such a way that an adequate degree of agitation can be maintained within the main vessel without the need to resort to additional mechanical agitators. As shown in FIG. 1, there are equal numbers of subsidiary conduits 6A, 6B into which oxygen or air are introduced; in practice the proportion of oxygen subsidiary conduits 6A to air subsidiary conduits 6B can vary as is appropriate for a particular application.

In one example of the method according to the invention a tank having a diameter of 30 meters is fitted with a ring main which has a circumference of about 88 meters. There are 16 equally-spaced subsidiary conduits 6A depending from the ring main 4, of which half are for introducing oxygen and the other half are for introducing air. The ring main has an internal diameter of 200 mm (8 inches) and is typically formed of PVC or HDPE (High Density Polyethylene) tubing. Each oxygen conduit 6A has above the throat of its venturi 8A a diameter of 75 mm (3 inches) and below the throat of the venturi 8A a diameter of 50 mm (2 inches) The outlet of each nozzle 12A typically has a diameter typically in the range of 10 to 45 millimeters and in this example 25 mm. Each air conduit 6B in a diameter of 75 mm and the diameter of the associated nozzle 12B would typically be in the range 10 to 45 millimeters. The pump 2 is operated so as to maintain a liquid velocity of 0.6 m/s (2 feet per second) within the ring main 4. Such a velocity is usually sufficient to scour any deposited solids from the ring main, though if desired greater velocities eg up to 1.2 m/s (4 feet per) second may be used. The apparatus shown in FIG. 1 may for example be used to dissolve 5 tonnes per day of oxygen in, and mix, a volume of 3000 m$^3$ of waste water employing a pump 2 capable of delivering 2500 m$^3$ per hour of water to the ring main 4 at a pressure of approximately 1.9–2.4 bara (9–14 mwg).

A plurality of oxygen demand sensors 14 (only one is shown, for clarity) are located within the volume of liquid, and are connected to control means 15 effective to vary the rate at which oxygen and/or air are introduced into the volume of liquid through the nozzles 12A, 12B which are closest to and/or directed in the direction of the sensor 14, so as fully to satisfy (and not oversatisfy) the oxygen demand thereat. The control means 15 is a suitably-programmed microprocessor which, in response to the instantaneous oxygen demand sensed by senor 14, actuates gas flow valves (not shown) in the respective oxygen/air inlets 10A, 10B and/or liquid flow valves (not shown) or the associated subsidiary conduits 6A, 6B. For clarity, operative connections are shown between the control means 15 and only one subsidiary oxygen conduit 6A and one subsidiary air conduit 6B.

Figure 2:
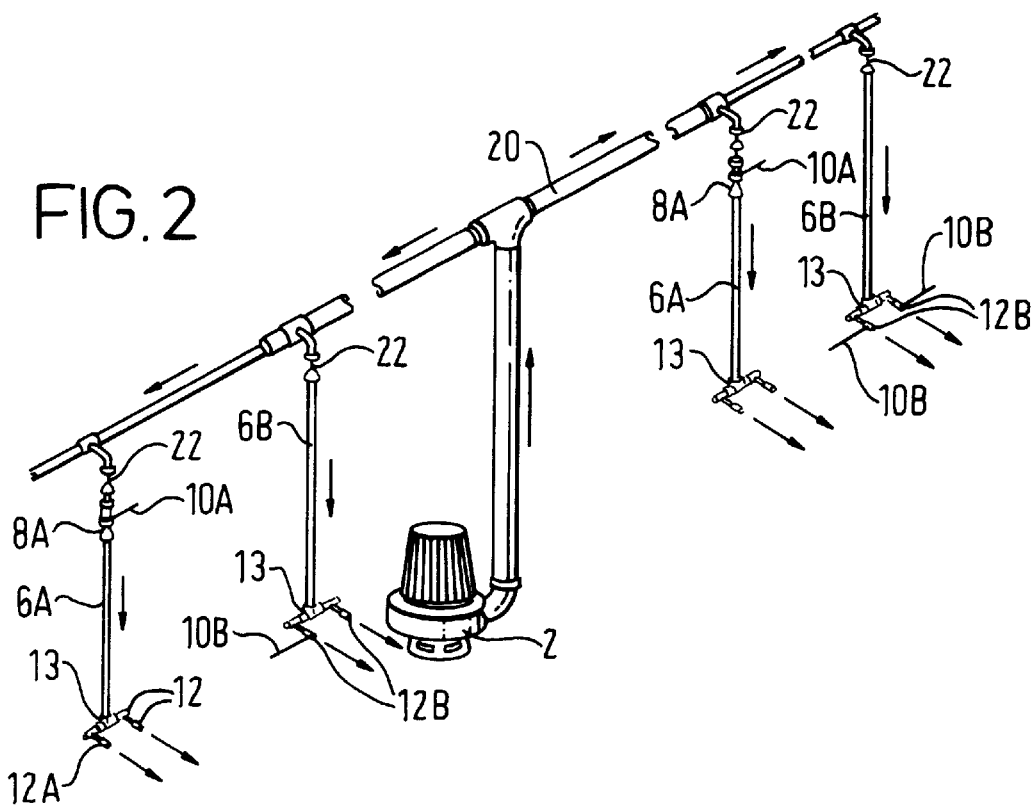
FIG. 2 is a schematic drawing, partly in perspective, of a second oxygenation apparatus according to the invention.

Referring to FIG. 2 of the drawings, there is shown an apparatus essentially similar to that of FIG. 1 save that an elongate main 20 is used instead of the ring main 4. In order to equalise the flows to the subsidiary conduits 6A, 6B which flows tend to be more variable than when a ring main used, each conduit 6A, 6B is provided with a flow control valve 22. The valves 22 can be set to compensate for the effect of pressure drop as the pumped liquid flows ever further away from the pump 2. If desired, the T-piece 13 may be constructed with a swivel or other joint whereby the direction in which the nozzles 12A, 12B point can be set independently of the others. In other respects, the operation and construction of the apparatus shown in FIG. 2 is analogous to that shown in FIG. 1. The apparatus shown in FIG. 2 can for example be used to oxygenate rivers, lagoons, harbours, multiple fish ponds, large activated sludge tanks, and estuaries.

Figure 3:
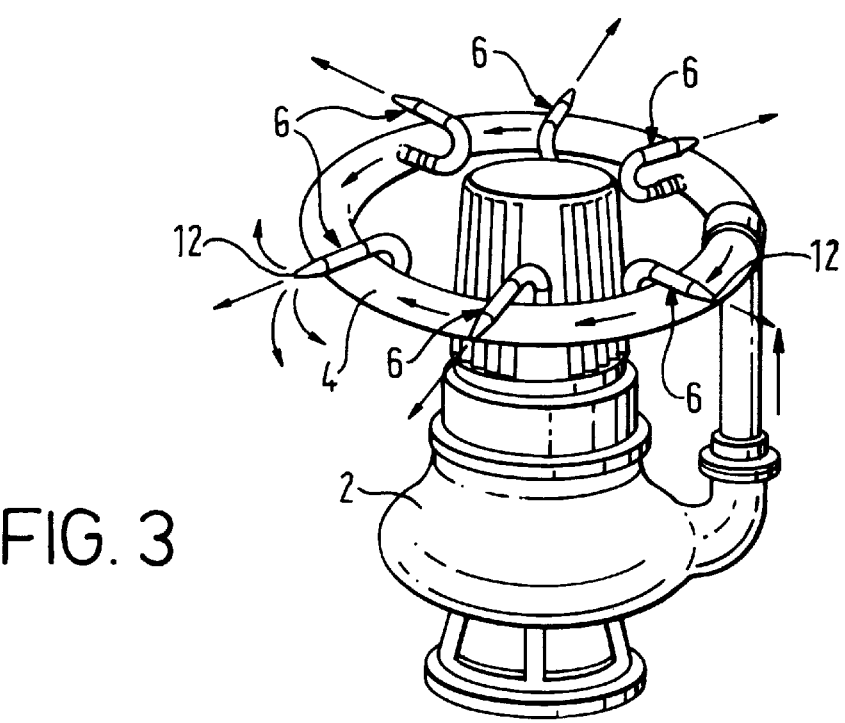
FIG. 3 is a schematic perspective view of a third oxygenation apparatus according to the invention.

In FIG. 3, there is shown another alternative apparatus to that shown in FIG. 1. The main difference between the two apparatuses is that the conduits 6 are shorter in the length in the apparatus shown in FIG. 3 than in that shown in FIG. 1. The conduits 6 are each generally J-shaped and terminate in a single nozzle 12 and are received in an inwardly facing part of the surface of the ring main 4. The nozzles 12 each face outwardly of the ring main. Although not shown in FIG. 3, each conduit 6 is connected either to an oxygen main or to an air main. The conduits 6 may be constructed with a joint or bearing whereby the direction in which each nozzle 12 points may be adjusted independently, either up or down or to the left or right. Such an arrangement facilitates oxygenation and mixing of the entire volume of liquid in which the apparatus shown in FIG. 3 is immersed. In a typical example of the operation of an apparatus as shown in FIG. 3, the pump 2 delivers 500 m$^3$/hour of water to the ring main at a pressure of approximately 1.4 bara (14 mhwg) and dissolves 1 tonne/day of total oxygen (from oxygen and air) in a volume of 500 m$^3$ of water. Typically, in operation, a liquid stream in which are dispersed fine gas bubbles leaves each nozzle 12 assembly at a velocity of about 10 m s$^{-1}$. In very large volumes of liquid an apparatus (or several) such as that shown in FIG. 3 may be placed in the centre of an apparatus of the kind shown in FIG. 1.

Figure 4:
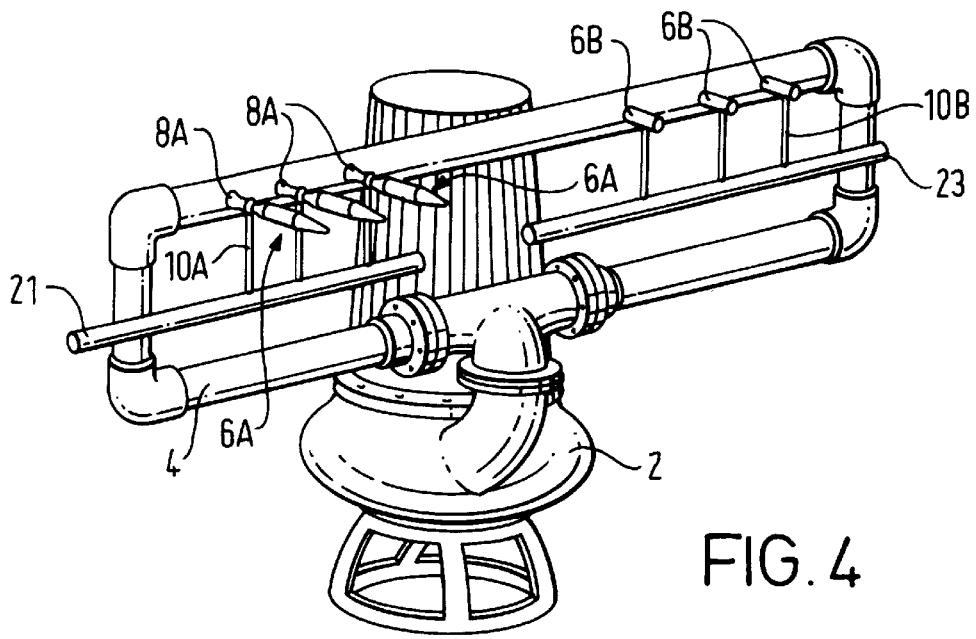
FIG. 4 is a schematic perspective view of a fourth oxygenation apparatus according to the invention.
Figure 5:
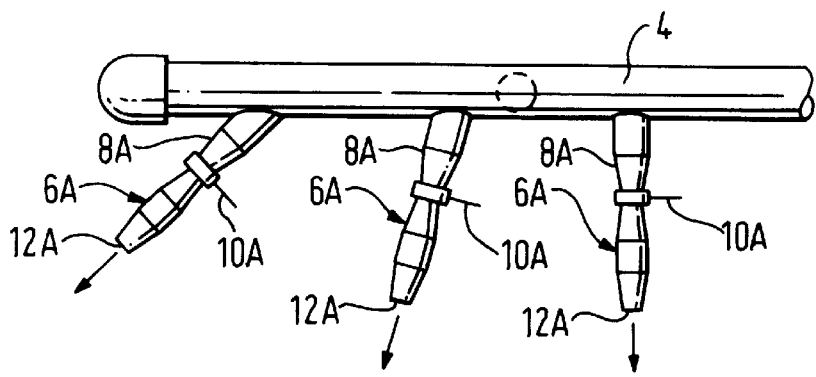
FIG. 5 is a plan view of part of a fifth oxygenation apparatus according to the invention.

Referring to FIG. 4 of the drawings there is shown an apparatus generally similar to those illustrated in FIGS. 1 and 3. In the apparatus shown in FIG. 4, the main 4 is endless and defines the shape of a rectangle. The main 4 is disposed generally vertically. Each conduit 6A, 6B is disposed generally horizontally and is formed as a one-piece construction, each oxygen conduit 6A with its associated venturi 8A and nozzle 12A, these three parts all being coaxial with one another. Oxygen is supplied to the inlets 10A from a main 21 and air is supplied to the inlets 10B from a main 23. As shown in FIG. 5, the nozzles 12A may be arranged in a fanned arrangement with respect to one another, as may the air nozzles 12B (not shown).

Figure 6A:
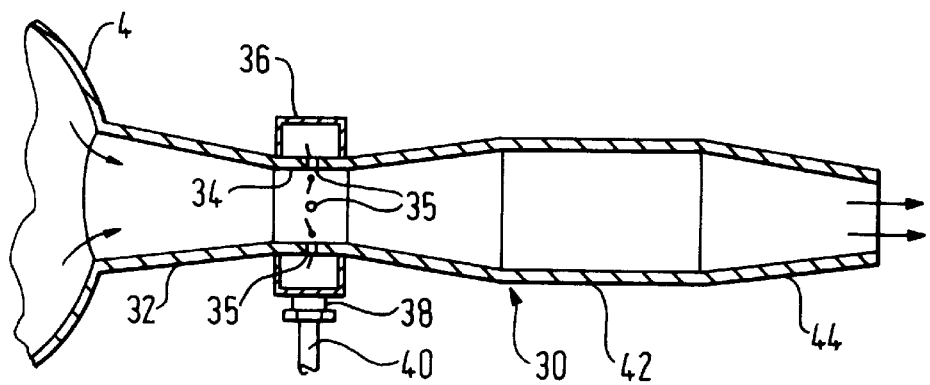
FIGS. 6A and 6B are sectional elevation views of nozzle for use in the oxygenation apparatuses shown in FIGS. 4 and 5, the nozzle of FIG. 6A adapted for introducing oxygen and that in FIG. 6B for introducing air.
Figure 6B:
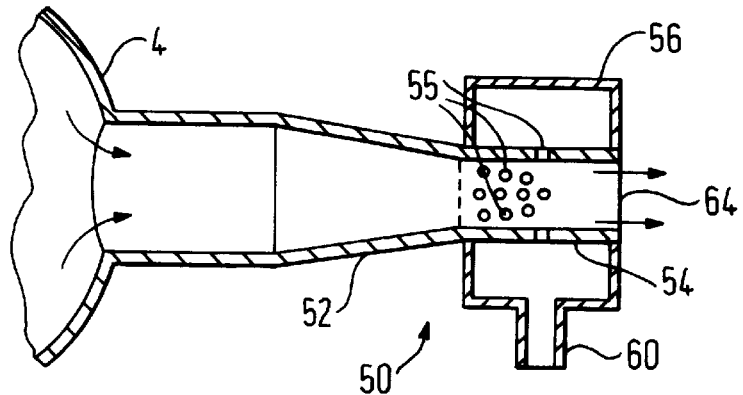

The nozzle devices shown in FIGS. 4 and 5 are shown in more detail in FIGS. 6A and 6B of the drawings. The tubular device 30 for introducing oxygen shown in FIG. 6A has an upstream venturi 32 whose inlet is joined to the main 4. The throat 34 of the venturi 32 is formed with apertures 35 which communicate with an annular gas distribution chamber 36 surrounding the throat 34. The chamber 36 has an inlet 38 communicating with a gas distribution pipe 40. The downstream end of the venturi 32 is contiguous with a right cylindrical portion 42 of the tubular device 30, which portion 42 is contiguous with a nozzle 44 which tapers in the downstream direction. In operation, a stream of water or liquid under pressure flows from the main 4 into the upstream end of the venturi 32. The throat 34 creates turbulence in the stream. Oxygen or other gas to be dissolved is introduced into the stream by passage from the chamber 36 through the apertures 35. The suction created by the flow of liquid through the venturi 32 may be sufficient to induce a flow of gaseous oxygen or air into the stream, or the gas may be supplied under pressure sufficient to ensure its entry into the stream. The throat 34 of the venturi 32 acts a restriction which creates turbulence in the stream, thus facilitating the break-up of the gas into bubbles. In the portion 42 of the device 30 the flow of the stream is rendered less turbulent. This portion 42 may have a length in the range of 0.3 to 1 m, and thus being relatively short keeps to a minimum pressure drop. The stream of liquid then enters the body of liquid, in which the apparatus according to the invention is immersed, through the nozzle 44 as a jet with a velocity typically in the range of 10 to 20 m s$^{-1}$. Such a velocity helps to create turbulence at the exit of the nozzle 44 which tends to shear the gas bubbles into bubbles of smaller size, while enabling the oxygen bubbles to penetrate into regions of the volume of liquid to be treated remote from the nozzle. The energy in the jet is thus dissipated in a relatively large volume of liquid which helps to keep the liquid well mixed.

The device 50 shown in FIG. 6B is for the introduction of air into liquid passing therethrough, and has an upstream tapering section 52 and a downstream section 54 of substantially constant cross-sectional area. The section 54 is formed with apertures 55 which communicate with an annular air distribution chamber 56 surrounding the section 54. (In the Figure, chamber 56 is shown abutting section 52, however in practice they may be separated by up to 1 m of constant diameter, imperfrate tubing). The chamber 56 communicates with an air inlet pipe 60. In operation, a stream of water or liquid under pressure flows from the main 4 into the tapering section 52. The tapering section 52 and the section 54 create turbulence in the stream. Air to be dissolved is introduced into the turbulent stream by passage from the chamber 56 through the apertures 55. Again, the arrangement is such that the stream of liquid containing air enters the body of the liquid, in which the apparatus in accordance with the invention is immersed, with a velocity sufficient to create turbulence at the exit 64 of the device 50, to shear the gas bubbles. No venturi is provided, in order to reduce the pressure at which the air must be supplied to chamber 56, because high back pressure in the air supply line requires a high purer pump to supply, and it is an aim of this invention to reduce the air pumping capacity.

Referring again to FIGS. 3 and 4, the pumps 2 shown therein are of a kind which can stand at the bottom of a tank or on a specially provided platform (not shown) such that the whole apparatus can be lowered into a tank of water to be oxygenated, so that the only connections to be made to services outside the tank are to the oxygen and/or air source and to the power line for the pump 4. Thus, installation of an apparatus of the kind shown in FIG. 3 or 4 is particularly simple to carry out.

Figure 7:
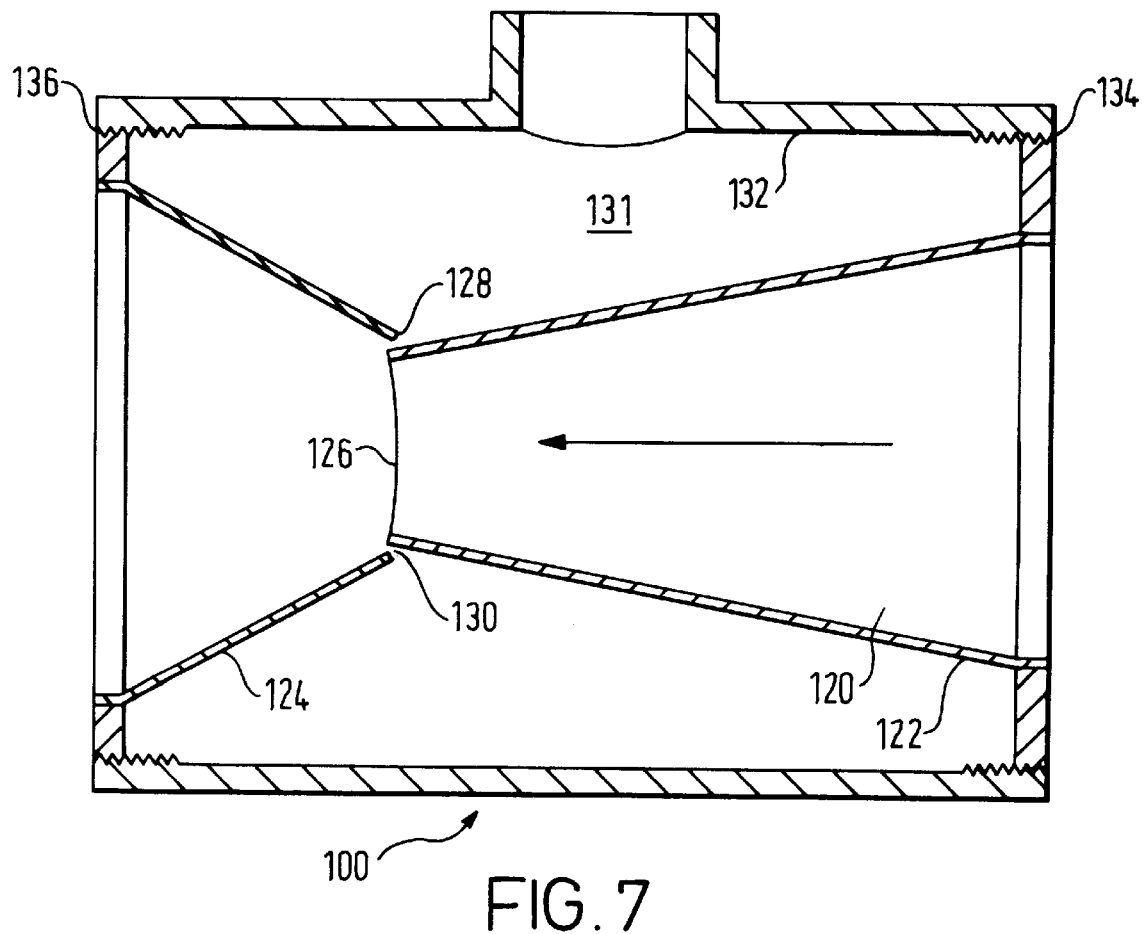
FIG. 7 is a sectional elevation view of a preferred form of nozzle for use in embodiments of the invention.

It has been found that a nozzle of the type disclosed in our European Patent No. 673 885 B1 is particularly suited for use with apparatus in accordance with the invention. Such a nozzle 100 is shown in FIG. 7 and comprises a duct 120 formed by a first generally convergent section such as, for example, truncated cone 122 and a second generally divergent section 124 (the flow of liquid through the nozzle in FIG. 7 being from right to left, as indicated by the arrow). The first section is provided with a narrower outlet end 126 than the inlet end 128 of the second section 128 and the two overlap so as to define an annular gap 130 therebetween. A plenum chamber 131 formed by a wall portion (in the form of, for example, a right circular tube 132 extending between the first and second sections 122, 124) and the sections 122, 124 is provided for receiving gas and for directing it to and through the annular gap for dissolution in the liquid flowing through duct 120. First and second sections 122, 124 are axially movable with respect to tube 132, by way of screw threads 134, 136, so as to vary the size of annular gap 130 and thus the cross-sectional area through which gas is able to flow. Operation of nozzle 100 is described in EP 673885 B1.

Nozzle 100 is suited for the dissolution of both air and oxygen, and thus is applicable to any of the embodiments illustrated in FIGS. 1 to 5. In particular, nozzle 100 has been found to be superior in practice to the nozzle 30, 50 illustrated in FIGS. 6A and 6B in several respects. Firstly, the nozzles 30, 50, when sited at a depth of 3m and operated with a 10 m/s liquid flow (measured at the throat) will give a range of about 7 m before the bubbles of gas reach the surface; with equivalent conditions, nozzle 100 gives a range of 9 m or more. With the annular gap 130 of nozzle 100 adjusted so as to have the same cross section area as the total area of the apertures 35, 55 in nozzles 30, 50, nozzle 100 is 50% more efficient. Adjustability of the annular 130 size in nozzle 100 is important because it allows variation of the back pressure on the gas compressor necessary for the gas to pass into the duct 120 at any predetermined rate. In addition, the smaller the annular gap the finer the resulting bubbles in the liquid. Lastly, it has been found that liquid flow through nozzle 100 will suffice in itself to induce gas flow through annulus 100, which is advantageous where gas is only available at low or near-ambient pressures, such as the output from a pressure swing adsorption apparatus or the like.

What is claimed is:

1. A method of dissolving oxygen-containing gas in a volume of liquid having a variable oxygen demand comprising pressurising the liquid, forming a main stream of the liquid, distributing the main stream into a plurality of subsidiary streams each having a velocity greater than that of the main stream, passing each of the subsidiary streams through means configured to create turbulence therein, introducing gas into the turbulence and introducing the gas-containing subsidiary streams into the volume of the liquid at a velocity sufficient to create further turbulence causing bubbles of said gas to shear into smaller bubbles, characterised by introducing oxygen into a first set of the subsidiary streams and air into a second set of the subsidiary streams, by sensing the instantaneous oxygen demand in the volume of liquid, and by maintaining constant the rate of introduction of said air and varying the rate of introduction of said oxygen in response to said sensing to meet the instantaneous oxygen demand of the liquid.

2. The method as claimed in claim 1 characterised in that the velocity of flow of the main stream is in the range 2 to 4 feet per second.

3. The method as claimed in claim 1 characterised in that each subsidiary stream is introduced into said volume of liquid in the form of one or more jets, each having a velocity in the range 30 to 65 feet per second.

* * * * *